United States Patent [19]

Brogie

[11] Patent Number: 4,722,465
[45] Date of Patent: Feb. 2, 1988

[54] CARRIER ATTACHMENT FOR AUTOMOTIVE VEHICLES

[76] Inventor: Earl W. Brogie, Box 336, Warrenville, Ill. 60553

[21] Appl. No.: 869,313

[22] Filed: Jun. 2, 1986

[51] Int. Cl.⁴ ............................................. B60K 9/04
[52] U.S. Cl. ................................... 224/329; 224/314; 224/42.46 R
[58] Field of Search ................ 224/42.45 R, 329, 273, 224/309, 314, 321, 42.46 R, 42.42; 248/240, 320, 352, 359, 360

[56] References Cited

U.S. PATENT DOCUMENTS

| | | | |
|---|---|---|---|
| 1,383,324 | 7/1921 | Martell | 224/42.45 R |
| 1,497,564 | 6/1924 | Howells | 224/42.45 R |
| 1,552,535 | 9/1925 | Beerstecher | |
| 2,302,300 | 11/1942 | Davies | 224/29 |
| 2,488,263 | 11/1949 | Bishman | 224/42.44 |
| 2,635,796 | 4/1953 | Davolt | 224/42.31 |
| 2,637,474 | 5/1953 | Vincenzo | 224/42.45 R |
| 4,108,342 | 8/1978 | Riva | 224/42.01 |

Primary Examiner—Henry J. Recla
Assistant Examiner—David Voorhees

[57] ABSTRACT

A carrier attachment assembly comprising a rigid base member, a rigid shelf member hingedly connected at a first end thereof to the base member, a rigid end member hingedly connected to a second end of the shelf member, and an attachment member connected to the base member for attaching the base member to an automotive vehicle.

8 Claims, 8 Drawing Figures

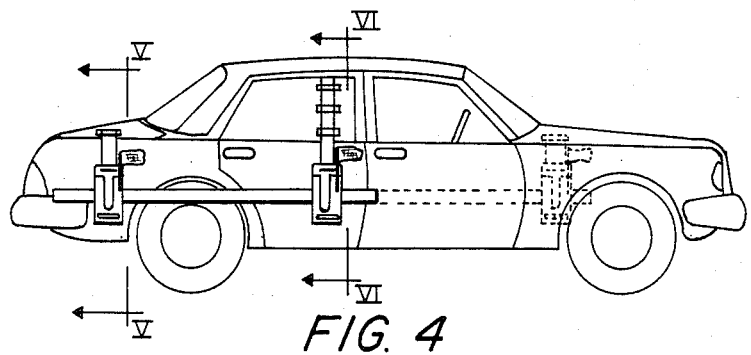
FIG. 4
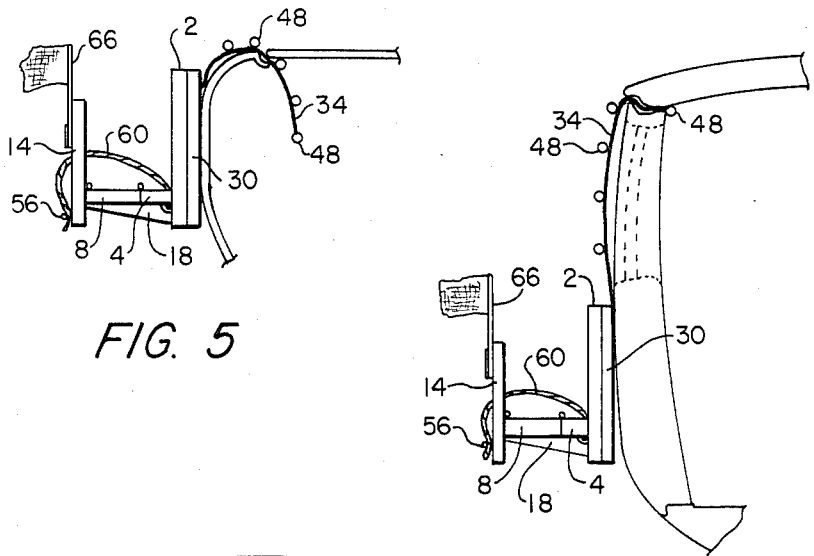
FIG. 5
FIG. 6
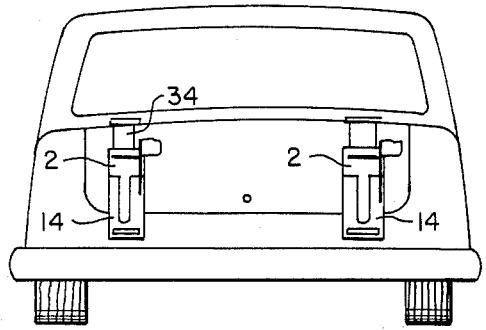
FIG. 7

CARRIER ATTACHMENT FOR AUTOMOTIVE VEHICLES

BACKGROUND OF THE INVENTION

1. Field of the Invention

This invention relates to carrier attachments for automotive vehicles and is directed more particularly to a rigid, collapsible carrier.

2. Discussion of the Prior Art

Carrier attachments for automobiles, and the like, are generally known. One type is illustrated in U.S. Pat. No. 4,108,342, issued Aug. 22, 1978 to Ralph D. Riva, in which is shown a carrier device utilizing loops of flexible strand material to encircle elongated objects being transported. Inasmuch as the device is flexible, it is easily stored when not in use.

Another type of carrier assembly is illustrated in U.S. Pat. No. 2,302,300, issued Nov. 17, 1942 to William O. Davies, in which is shown a rigid bracket assembly which may be durable and strong but, being rigid, may present some storage difficulties during periods of non-use.

SUMMARY OF THE INVENTION

An object of the present invention is to provide a carrier assembly of strong and rigid construction, but which is collapsible to facilitate easy storage.

With the above and other objects in view, as will hereinafter appear, a feature of the present invention is the provision of a carrier attachment assembly comprising a rigid base member, a rigid shelf member hingedly connected at a first end thereof to the base member, a rigid end member hingedly connected to a second end of the shelf member, and an attachment member connected to the base member for attaching the base member to an automotive vehicle.

The above and other features of the invention, including various novel details of construction and combinations of parts, will now be more particularly described with reference to the accompanying drawings and pointed out in the claims. It will be understood that the particular device embodying the invention is shown by way of illustration only and not as a limitation of the invention. The principles and features of this invention may be employed in various and numerous embodiments without departing from the scope of the invention.

BRIEF DESCRIPTION OF THE DRAWINGS

Reference is made to the accompanying drawings in which is shown an illustrative embodiment of the invention from which its novel features and advantages will be apparent.

In the drawings:

FIG. 4 is a side elevational view of an automobile with a plurality of the illustrative carrier assemblies in place;

FIG. 5 is a sectional view, taken along line V—V of FIG. 4;

FIG. 6 is a sectional view, taken along line VI—VI of FIG. 4;

FIG. 7 is a rear elevational view of an automobile showing two of the illustrative carrier assemblies in an alternative position.

DESCRIPTION OF THE PREFERRED EMBODIMENT

Figure 1:
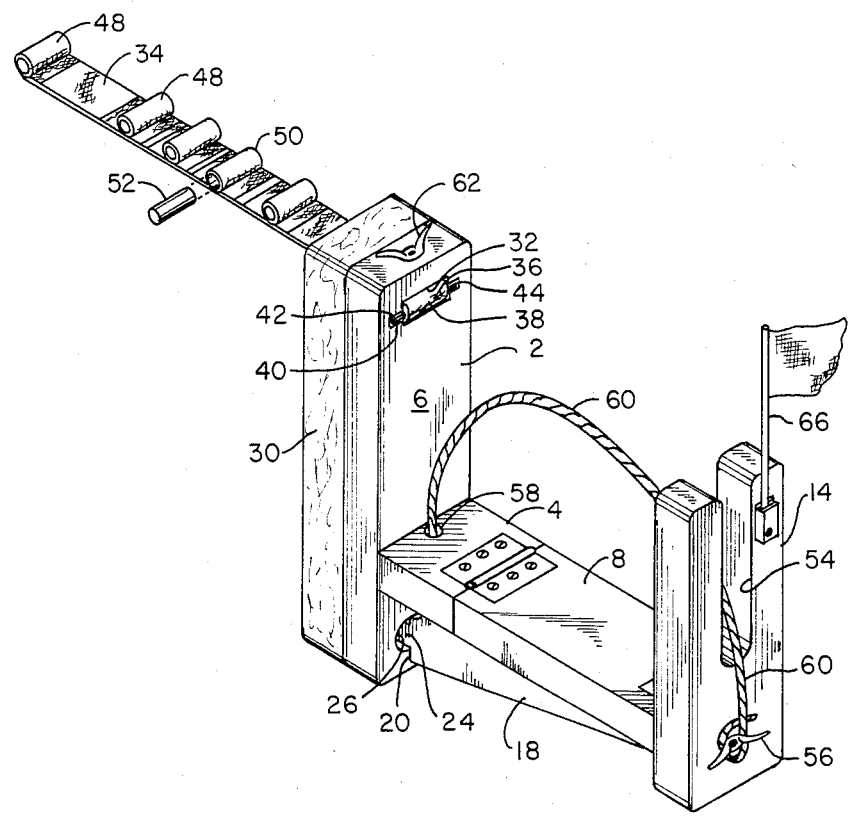
FIG. 1 is a perspective view of one form of carrier attachment assembly for automobiles, illustrative of an embodiment of the invention.
Figure 2:
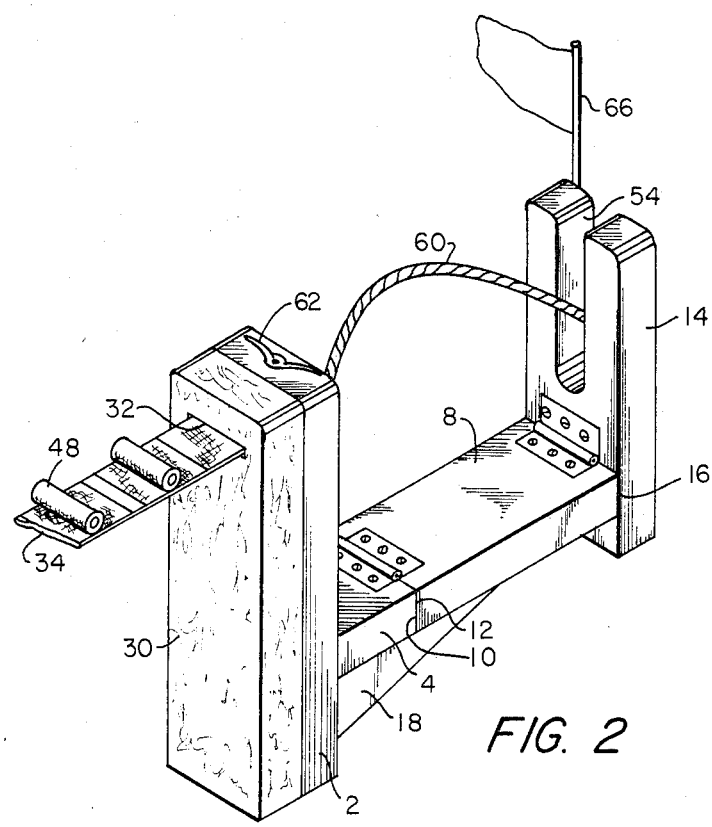
FIG. 2 is a further perspective view of the attachment assembly taken from a different angle.

Referring to the drawings, and particularly FIGS. 1 and 2, it will be seen that the illustrative embodiment of the invention includes a base member 2. A protrusion portion 4 extends outwardly from a first side 6 of the base member substantially normal to the base member.

A shelf member 8 is, at a first end 10 thereof, hingedly connected to a free end 12 of the protrusion portion 4 of the base member 2. An end member 14 is hingedly connected to a second end 16 of the shelf member 8.

Figure 3:
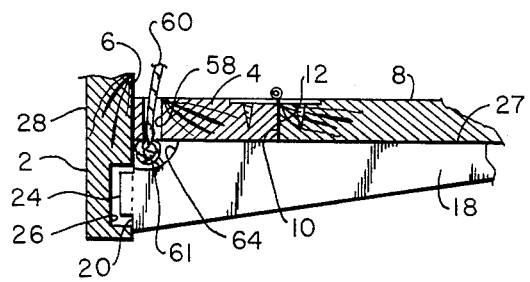
FIG. 3 is a sectional view of a portion of the attachment assembly.

Connected to an undersurface of the shelf member 8 is a support member 18 adapted at its first end 20 to abut the base member 2 and at its second end 22 (FIG. 8) to abut the end member 14. At its first end 20, the support member 18 is provided with a dowel portion 24 adapted to engage a recess 26 in the base member (FIG. 3). On its free upper surface 27, the support member 18 is adapted to abut the base member protrusion 4.

On its second side 28, the base member 2 is provided with a pad member 30. A slot 32 extends through the pad member 30 and base member 2 and is adapted to receive a flexible belt 34. An end 36 of the belt 34 has a loop, or pocket, 38 sewn therein adapted to receive a rod 40, the length of which exceeds the length of the slot 32. Recesses 42, 44 are provided in the base member 2 at either end of the slot 32, the recesses being adapted to receive the exposed ends of the rod 40, to securely affix the belt 34 to the base member 2. Pins (not shown) may be placed in diametric holes in the rod 40 to insure that the rod remains in the pocket 38.

The belt 34 is provided with enlarged width-wise extending portions 48 spaced along the length of the belt. In practice, the enlargements 48 may be sewn pockets 50 adapted to receive spools 52, or the like.

The end member 14 is provided with an open-ended slot 54 and proximate the closed end thereof a cleat member 56. The base member protrusion portion 4 is provided with an orifice 58 extending therethrough. A flexible line 60 may be knotted 61 beneath the orifice 58 and extend through the orifice 58 and be adapted to bridge over the shelf member 8, pass through the slot 54 and be secured to the cleat member 56. A second cleat member 62 may be fixed to the top of the base member 2 and, if desired, the flexible line 60 may be lead from the orifice 58, around the second cleat member 62 and onto the cleat member 56. The support member 18 is provided, at its first end 20, with a notch 64 to accommodate the flexible line knot 61.

Pivotally mounted on the end member 14 is an elongated pole member 66 which may, if desired, be provided with a flag or pennant at its free end. The pole member is moveable between a first position, shown in FIG. 8, in which the pole member is wholly disposed within the boundaries of the end member 14, and a second position, illustrated in FIG. 1, in which the pole extends well beyond the upper end of the end member.

In operation, the device is constituted as shown in FIGS. 1 and 2 and is attached to an automobile, or other vehicle, in known fashion, as shown in FIGS. 4–7. The pad member 30 rests against the automobile. The base member 2, shelf member 8, and end member 14, provide a substantially U-shaped carrier of substantial capacity and durability. The line 60 serves to securely lash down the cargo in the carrier. The pole member 66 serves to provide visual notice as to the whereabouts of the outermost portions of the assemblies. Typically, the carrier assemblies would be used in pairs, though three or more might be suitable for a particular task.

Figure 8:
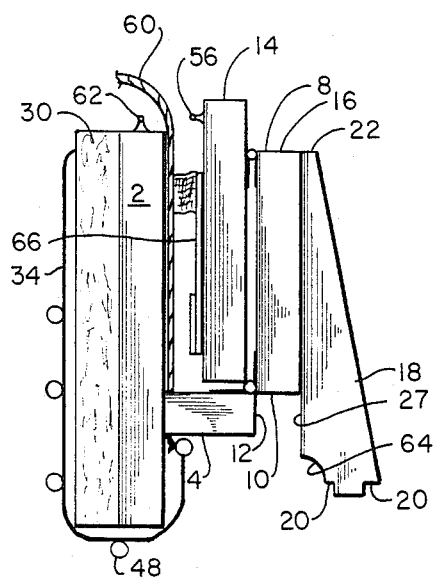
FIG. 8 is a side elevational view of the carrier apparatus in a folded condition.

Upon completion of the cargo carrying operation, the assembly is released from the vehicle by simply opening the hood, door, or trunk lid holding the belt 34. The end member 14 is then hingedly moved toward the shelf member 8 until the two 8, 14 are substantially parallel, and the shelf member is then hingedly pivoted toward the base member 2, until the three basic components 2, 8, 14 are substantially parallel (FIG. 8). As such, the assembly may be easily stored until next needed.

It is to be understood that the present invention is by no means limited to the particular construction herein disclosed and/or shown in the drawings, but also comprises any modifications or equivalents within the scope of the disclosure. For example, in practice it may in some instances be advantageous to have the hinges recess so that the upper surfaces of the members 4 and 8 are entirely flush and the corner area formed by the members 8 and 14 is unobstructed.

Having thus described my invention, what I claim as new and desire to secure by Letters Patent of the United States is:

1. A carrier attachment assembly comprising a rigid base member, a protrusion extending from a first side of said base member, a rigid shelf member hingedly connected at a first end thereof to a free end of said protrusion, said protrusion being substantially normal to said base member, a rigid end member hingedly connected to a second end of said shelf member, said end member being provided with an open-ended slot, a cleat member fixed to said end member proximate a closed end of said slot, a flexible tie member extending from said base member and adapted to be disposed in said slot and to be secured to said end member cleat, means attached to said base member for attaching said base member to an automotive vehicle, and a rigid support member fixed to a surface of said shelf member and adapted at a first end to abut said base member and adapted at a second end to abut said end member, said support member first end being provided with a dowel portion and said base member being provided with an opening adapted to receive said dowel portion.

2. The carrier attachment assembly in accordance with claim 1 in which said attaching means comprises a flexible belt member having enlarged portions extending width-wise thereof and spaced along the length thereof.

3. The carrier attachment assembly in accordance with claim 2 in which said base member is provided with a slot adapted to receive said flexible belt member, an end of said belt member being provided with a loop adapted to receive a rod, said rod having a length greater than the length of said base member slot, said base member having recesses proximate said slot and adapted to receive ends of said rod, whereby said rod operates to removably connect said belt member to said base member.

4. The carrier attachment assembly in accordance with claim 1 and further comprising a pole member pivotally mounted on said end member and moveable between a first position in which said pole member is disposed with the borders of said end member and a second position in which said pole member extends beyond the open-slot end of said end member.

5. The carrier attachment assembly in accordance with claim 1 and further comprising a pad member fixed to a second site of said base member.

6. A carrier attachment assembly comprising a rigid base member, a protrusion extending from a first side of said base member, a rigid shelf member hingedly connected at a first end thereof to a free end of said protrusion, said protrusion being substantially normal to said base member, a rigid end member hingedly connected to a second end of said shelf member, a rigid support member fixed to a surface of said shelf member and adapted at a first end to abut said base member and adapted at a second end to abut said end member, and attaching means connected to said base member for attaching said base member to an automotive vehicle, said attaching means comprising a flexible belt member having enlarged portions extending width-wise thereof and spaced along the length thereof, said base member being provided with a slot adapted to receive said flexible belt member, an end of said belt member being provided with a loop adapted to receive a rod, said rod having a length greater than the length of said base member slot, said base member having recesses proximate said slot and adapted to receive ends of said rod, whereby said rod operates to removably connect said belt member to said base member.

7. The carrier attachment assembly in accordance with claim 6, in which said end member is provided with an open-ended slot, a cleat member fixed to said end member proximate a closed end of said slot, and a flexible tie member extending from said base member and adapted to be disposed in said slot and to be secured to said end member cleat.

8. The carrier attachment assembly in accordance with claim 6 in which said support member first end is provided with a dowel portion and said base member is provided with an opening adapted to receive said dowel.

* * * * *